United States Patent [19]

Salani et al.

[11] Patent Number: 4,686,880

[45] Date of Patent: Aug. 18, 1987

[54] DIGITAL INTERFACE FOR ACOUSTIC AND ELECTRICALLY AMPLIFIED PIANOS

[75] Inventors: Steven J. Salani, Milpitas; Jeffrey C. Moffatt, Cupertino, both of Calif.

[73] Assignee: Forte Music, Inc., San Jose, Calif.

[21] Appl. No.: 601,474

[22] Filed: Apr. 18, 1984

[51] Int. Cl.[4] .......................... G10H 1/34; G06F 3/02

[52] U.S. Cl. .................................. 84/1.01; 340/365 S; 340/365 R; 340/365 A

[58] Field of Search ............ 340/365 S, 365 R, 365 C, 340/712; 84/1.1, DIG. 7, 1.26, 1.27, 433, 434, 436

[56] References Cited

U.S. PATENT DOCUMENTS

| | | | |
|---|---|---|---|
| 3,604,299 | 9/1971 | Englund | 84/1.03 |
| 3,789,719 | 2/1974 | Maillet | 84/115 |
| 4,023,456 | 5/1977 | Groeschel | 84/115 |
| 4,067,253 | 1/1978 | Wheelwright et al. | 84/1.1 |
| 4,104,949 | 8/1978 | Clark | 84/462 |
| 4,138,916 | 2/1979 | Kitagawa | 340/365 S |
| 4,186,638 | 2/1980 | Iijima | 340/365 S |
| 4,307,648 | 12/1981 | Stahnke | 84/462 |
| 4,351,221 | 9/1982 | Starnes et al. | 84/1.28 |
| 4,414,538 | 11/1983 | Schnizlein | 340/365 S |
| 4,469,000 | 9/1984 | Fujiwara et al. | 84/1.1 |
| 4,506,581 | 3/1985 | Sunada | 84/1.1 |
| 4,510,839 | 4/1985 | Kumano | 84/834 |
| 4,520,706 | 6/1985 | Deforeit | 84/DIG. 7 |
| 4,528,885 | 7/1985 | Chihana | 84/1.1 |

*Primary Examiner*—John W. Caldwell, Sr.
*Assistant Examiner*—Mahmoud Fatahi-Yar
*Attorney, Agent, or Firm*—Townsend and Townsend

[57] ABSTRACT

A digital keyboard interface for a keyboard operated musical instrument, such as a piano, includes at least one switch associated with each key on the keyboard and positioned therebeneath. Key actuation produces a corresponding associated switch actuation. The keyboard interface is readily installed within an acoustic or electronic piano and includes adjustments for height and side-to-side alignment to provide precise registration of keys and switches and to provide simplified installation of the interface within the piano. A switch matrix includes a plurality of rows that assign switch closure information to corresponding data byte bit positions in a digital data stream. A shift register sequentially, and on a one-at-a-time basis, actuates a series of matrix columns to read a set of swtiches associated with the column. Thus, each switch operated in an actuated column corresponds to a data byte bit position in the data stream which is further processed to generate a serial data stream for external devices. One embodiment of the invention provides switches of the type having two contact sets by which key velocity information may be transmitted to an external electronic musical instrument or memory device. The invention also provides an interface for collecting and transmitting piano pedal information.

1 Claim, 7 Drawing Figures

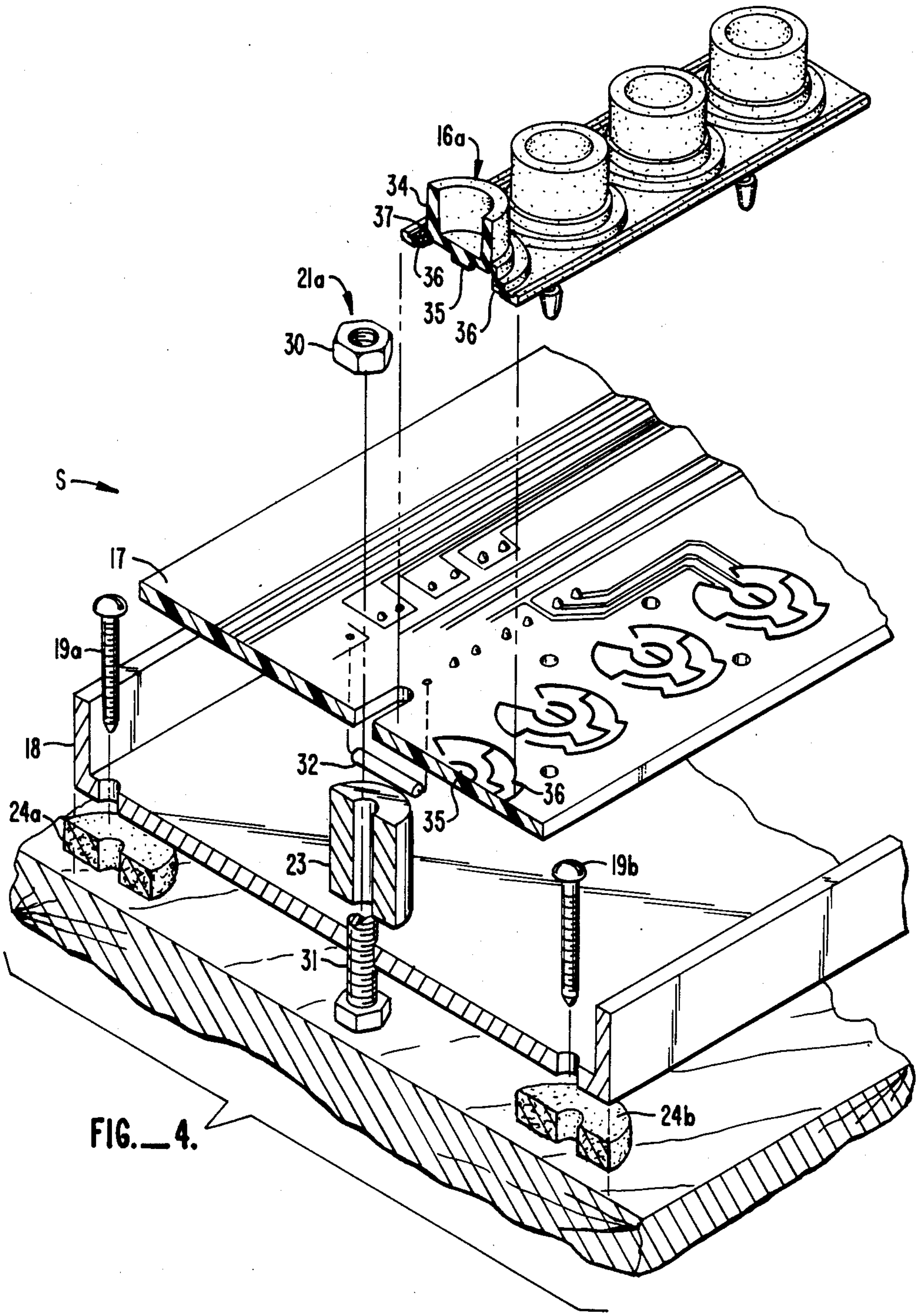
FIG.__4.

DIGITAL INTERFACE FOR ACOUSTIC AND ELECTRICALLY AMPLIFIED PIANOS

BACKGROUND OF THE INVENTION

1. Field of the Invention

The present invention relates to keyboard operated musical instruments. More particularly, the present invention relates to interfacing an acoustic or electrically amplified piano to a digital computer, storage device, or music synthesizer.

2. Description of the Prior Art

Since before the turn of the century, efforts have been made to capture information from acoustic keyboard instruments as the instruments are played. Early devices of this type were predominantly player pianos wherein a performance could be captured in the form of holes on paper that controlled a pneumatic piano control system. The point of such devices was to make one recording on a paper roll of the performance. Thereafter, the performance could be replayed as desired on a player piano by use of a copy of the original paper roll.

One more recent approach to capturing keyboard information during a performance employs a switch matrix including a single matrix row coupled to a bus extending underneath a piano keyboard and having a number of matrix columns corresponding to the number of keys on the instrument. The switch matrix includes a contact on each key operable to contact the matrix bus when the key is operated and thus indicate a switch closure. Such device is shown in U.S. Pat. No. 3,604,299, issued to Englund, Sept. 14, 1971.

The installation of such device is time consuming and, therefore, expensive. Once installed, it is likely that the action of the piano may be affected. Additionally, the open contact and bus system is subject to performance degradation and lack of reliability as the result of oxidation and contact wear. A similar arrangement is provided in U.S. Pat. No. 4,023,456, issued to Groeschel on May 17, 1977.

U.S. Pat. No. 4,104,949, issued to Clark on Aug. 8, 1978, provides a series of keys located on the piano above the keyboard and including sensors responsive to keyboard operation. The location of such device above the keyboard eliminates some of the playing area on the keyboard available to the musician and, thus, interferes with normal keyboard operation.

The most recent approach to capturing keyboard information in a mechanical or electrical manner is shown in U.S. Pat. No. 4,307,648, issued to Stahnke on Dec. 29, 1971 and in U.S. Pat. No. 4,351,221, issued to Starnes et al. on Sept. 28, 1982. Both such devices use an optical switch including a light source and photo cell. Key operation results in movement of a key or hammer within the piano mechanism that produces a corresponding movement of a flag attached thereto. As a result, a beam of light between the light source and photo cell is broken by interposition of the flag, and information is produced corresponding to key operation.

Such devices are installed to the piano action during a time consuming and, therefore, expensive installation procedure. Because there is continual movement of the flag, there is a likelihood that the flag will become dislodged or slip out of alignment and not operate the optical switch properly. Thus, such systems generally require considerable maintenance. Furthermore, the addition of a flag to the piano action might, in some circumstances, affect the action of the piano and, thus, alter or degrade the feel and playing quality of the piano.

An additional problem in prior art keyboard interfaces is that of cabling. A standard piano keyboard has eighty-eight keys. Known keyboard interfaces, therefore, require a cable assembly including eighty-nine wires (eighty-eight key wires and one return or ground wire). Although there have been some attempts to reduce this number of wires through various decoding and latching schemes, generally, significant problems are introduced by the prior art devices when routing cables to transfer electronic signals in response to keyboard operation.

Electronic musical instruments include the well-known electronic music synthesizer, a device that is capable of imitating many known electronic and acoustic instruments, as well as producing its own unique sounds. Electronic music synthesizers are operated by keyboards, or slide controllers or both. One disadvantage of an electronic music synthesizer is that the keyboard generally provided is of a size (that is, number of keys), and has an action or feel unlike that of acoustic pianos. Many musicians have studied on acoustic pianos. A musician who has become accustomed to the feel of a particular keyboard tends to prefer that particular keyboard over other keyboards having a different feel.

Another disadvantage of synthesizers is that they introduce an additional keyboard into a playing configuration. For example, during a performance, a musician who plays both an acoustic keyboard instrument and an electronic music synthesizer has to physically shift between the two. Such additional keyboards take up space in the club or theater where the performance is to be held and provide extra equipment to be transported from location to location in accordance with the musician's itinerary.

SUMMARY OF THE INVENTION

The present invention is a digital interface for acoustic and electrically amplified pianos. The invention allows the operation of such pianos without interfering with the action or feel of the piano keyboard. The device, when installed to the piano, allows the piano to be operated as an acoustic instrument, as a controller for an electronic musical instrument or electronic storage device, and as both an acoustic and electronic musical instrument simultaneously.

The invention includes a plurality of polymer-type switches, one each associated with each keyboard key. The switches are mounted to a modular switch assembly that is fastened to the piano directly beneath the piano keys. The invention provides height and side-to-side switch alignment adjustments to permit accurate registration between the piano keys and the switch assembly switches without interfering with piano keyboard action or feel. Because modular assemblies are used, the present invention is readily installed within any acoustic piano in a relatively short period of time and with minimal effort and expense. The use of polymer switches insures reliability and ease of operation.

The invention may also include polymer switches of the type including two contact sets, each of which is operated at a different point during key travel. In this way, information relating to the intensity, attack, sustain, and decay of each played note may be captured and used to control an electronic instrument.

The invention may also provide pedal interface switches to control piano sustain, keyboard transposition, and keyboard range selection. Information collected via the present invention may be used to control an electronic instrument operating in the musical instrument digital interface (MIDI) standard. Such standard is commonly in use in the musical industry and, thus, allows the present invention to control any of the several commercially available electronic musical instruments, data storage devices, or digital computers.

The present invention provides a switch matrix for each switch assembly by which switch closure information is encoded. Several switch assemblies may be used, depending on keyboard length. All switch assemblies are identical in configuration, readily interconnected, and transparent one to the other within the interface.

A shift register is provided on each switch assembly that controls a series of switch matrix columns. Each switch matrix row corresponds to a bit position in a digital data byte stream. The present invention reduces the cabling requirement within the interface by sharing a data bus and by sequentially operating the shift registers in such manner that, at any given time during a sequence, only one column within all of the switch assemblies is actuated. This is accomplished by loading a logic "one" into an initial shift register and using a microprocessor generated clock signal to shift the logic "one" through the shift register. After an initial shift register has had the logic "one" shifted therethrough, the logic "one" is passed to subsequent shift registers and shifted across these and other switch assemblies until the entire keyboard is scanned. Thereafter, the process repeats.

The present invention provides a simple, reliable, and easy to install digital interface for acoustic and electric pianos. A digital output is provided in a known standard format by the invention which interferes only negligibly with keyboard operation, action, and dynamics.

BRIEF DESCRIPTION OF THE DRAWINGS

FIG. 4 is a side cross-sectional detail of polymer switch of the type used in the present invention;

DETAILED DESCRIPTION OF A PREFERRED EMBODIMENT

The present invention is a digital interface for acoustic and electrically amplified pianos. The device is intended for use with such pianos in a studio or during a live performance. The invention is readily installed to a piano keyboard without modification of the keyboard or the piano action. Thus, the invention is quickly installed without changing the feel or appearance of the keyboard—it is transparent to the player. A piano keyboard K is shown in a perspective cross-sectional view in FIG. 1 including a series of piano keys 10–12. The present invention consists of at least one switch assembly S mounted to a top surface 15 of a keyboard base 14. A series of switches **16*a*–16*c* are located directly underneath piano keys 10–12. When one of keys 10–12 is struck by a musician, corresponding key movement operates an associated one of switches 16*a*–16*c*** to produce a switch closure.

Figure 1:
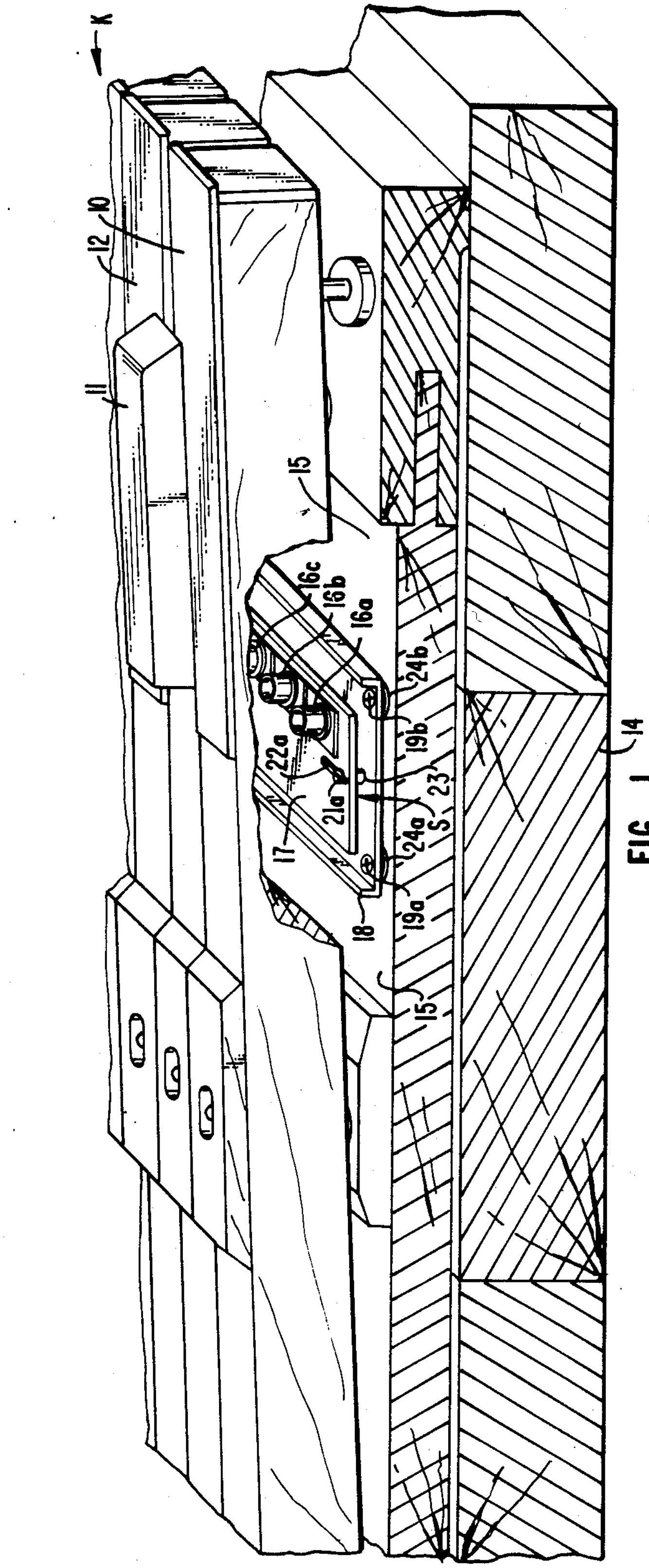
FIG. 1 is a perspective cross-sectional view of a piano keyboard showing the keyboard in partial cutaway, including the present invention.

For the sake of brevity, only three keys (10–12) and three corresponding switches (**16*a*–16*c* are shown. A standard keyboard to which the present invention is intended to be attached includes eighty-eight keys and, therefore, eighty-eight corresponding switches. Likewise, one switch assembly is shown in FIG. 1**, although, for an eighty-eight key keyboard, three such assemblies are used in the preferred embodiment of the invention.

Switch assembly S includes a printed circuit board 17 to which switches **16*a*–16*c* are mounted. Printed circuit board 17 includes at least one slot 22*a* through which a fastener 21*a* extends for securing printed circuit board 17 to switch assembly base 18. Printed circuit board 17 is spaced from base 18 by a spacer 23. Slot 22*a* allows side-to-side movement of the printed circuit board relative to piano keyboard K. In this way, switches 16*a*–16*c* may be placed exactly under, and in proper registration with, corresponding keys 10–12**.

Switch assembly base 18 includes several apertures through which a fastener, such as mounting screws **19*a* and 19*b* extend to secure switch assembly base 18 to keyboard base 14 at base surface 15. Spacers 24*a* and 24*b* are used to set the elevation of switches 16*a*–16*c* relative to keys 10–12** in such manner that key travel properly operates the switches. This adjustment can be critical in some embodiments of the invention where velocity information is also detected by the switches. In the preferred embodiment, commonly available piano shims are used to adjust the height of the switch assembly.

Figure 2:
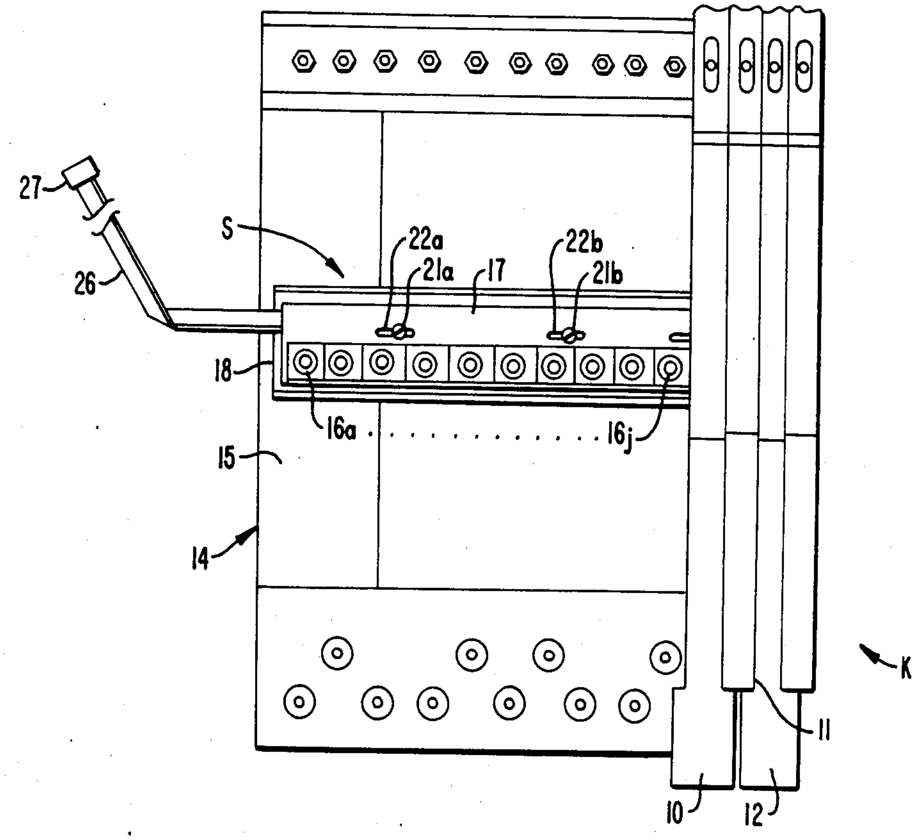
FIG. 2 is a top plan view of a piano keyboard showing the present invention.

A top plan view of keyboard K showing switch assembly S is provided in FIG. 2. Slots **22*a* and 22*b* are shown along with corresponding fasteners 21*a* and 21*b*. A series of switches 16*a*–16*j* are shown arranged across and fastened to switch assembly S. The output of switch assembly S is routed through a cable 26 to a connector 27**. Digital signals produced by the invention are thereafter processed and coupled to an electronic musical instrument or storage device according to the musical instrument digital interface standard (MIDI), or any other data standard.

Figure 3:
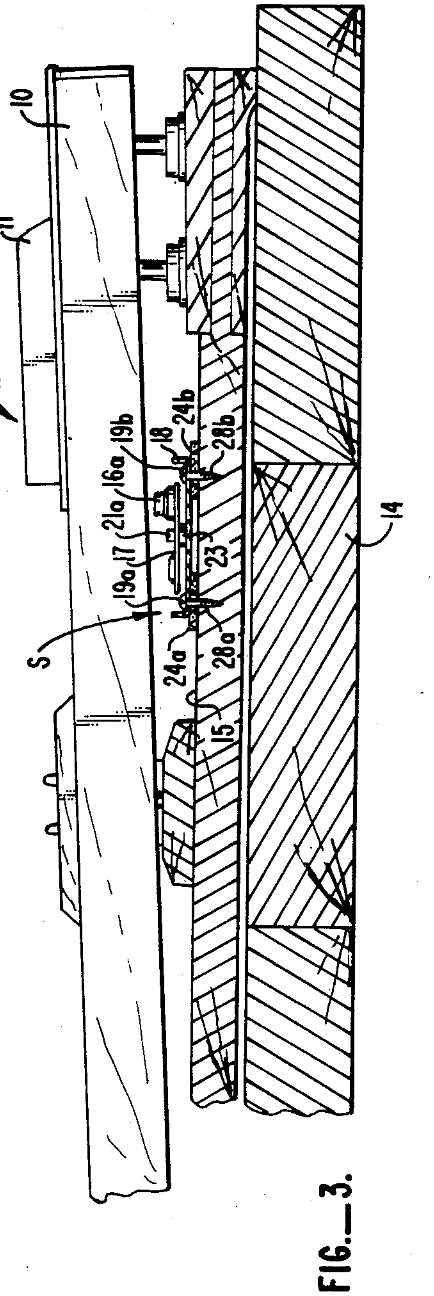
FIG. 3 is a side elevational cross-sectional view of a keyboard, including the present invention.

A side elevational cross-sectional view of piano keyboard K is shown in FIG. 3. A profile of switch assembly S is shown including a switch **16*a* spaced from key 10. As stated above, vertical spacing of the switch from the keyboard key is accomplished by spacers 24*a* and 24*b*. The switch assembly is fastened to keyboard base 14 by fasteners 19*a* and 19*b* which may be threaded fasteners, such as screws having threaded fastening surfaces 28*a* and 28*b***.

A detailed side view of switch assembly S is shown in FIG. 4. Printed circuit board 17 includes a component portion 32, a threaded fastener 31 and a nut 30 for securing printed circuit board 17 to switch assembly base 18, and a switch **16*a***.

Switch **16*a* is of the type of polymer switch that is known in the art, such as is manufactured by the Panasonic Corporation, Division of Matsushita Corporation of Japan, and may be formed from such polymeric materials as silicone rubber. The switch includes a contact portion 34 and a flexure portion 37. The preferred embodiment of the invention provides two sets of switch contacts, a central switch contact set 35 and a circumferential outer switch contact set 36. Two such contact sets are provided to sense the dynamics of key motion. That is, the structure of switch flexure portion 37 is such that a greater amount of travel is required to close contact set 36. Thus, when an assooiated piano key is pressed, only contact set 35 is initially closed. Shortly thereafter (depending on the amount of force with which the piano key is struck), contact set 36 is closed. As long as such force is maintained on the piano key, contact sets 35 and 36 remain closed. When pressure is released from the piano key, contact set 36 is opened first. Shortly thereafter, contact set 35** is opened.

The various dynamics of striking a piano key are thus modeled by the closure of both switch contact sets, the interval between closure of the first switch contact set and the second switch contact set, the interval during which both contact sets remain closed, and interval between the opening of one contact set and the other contact set.

Figure 5:
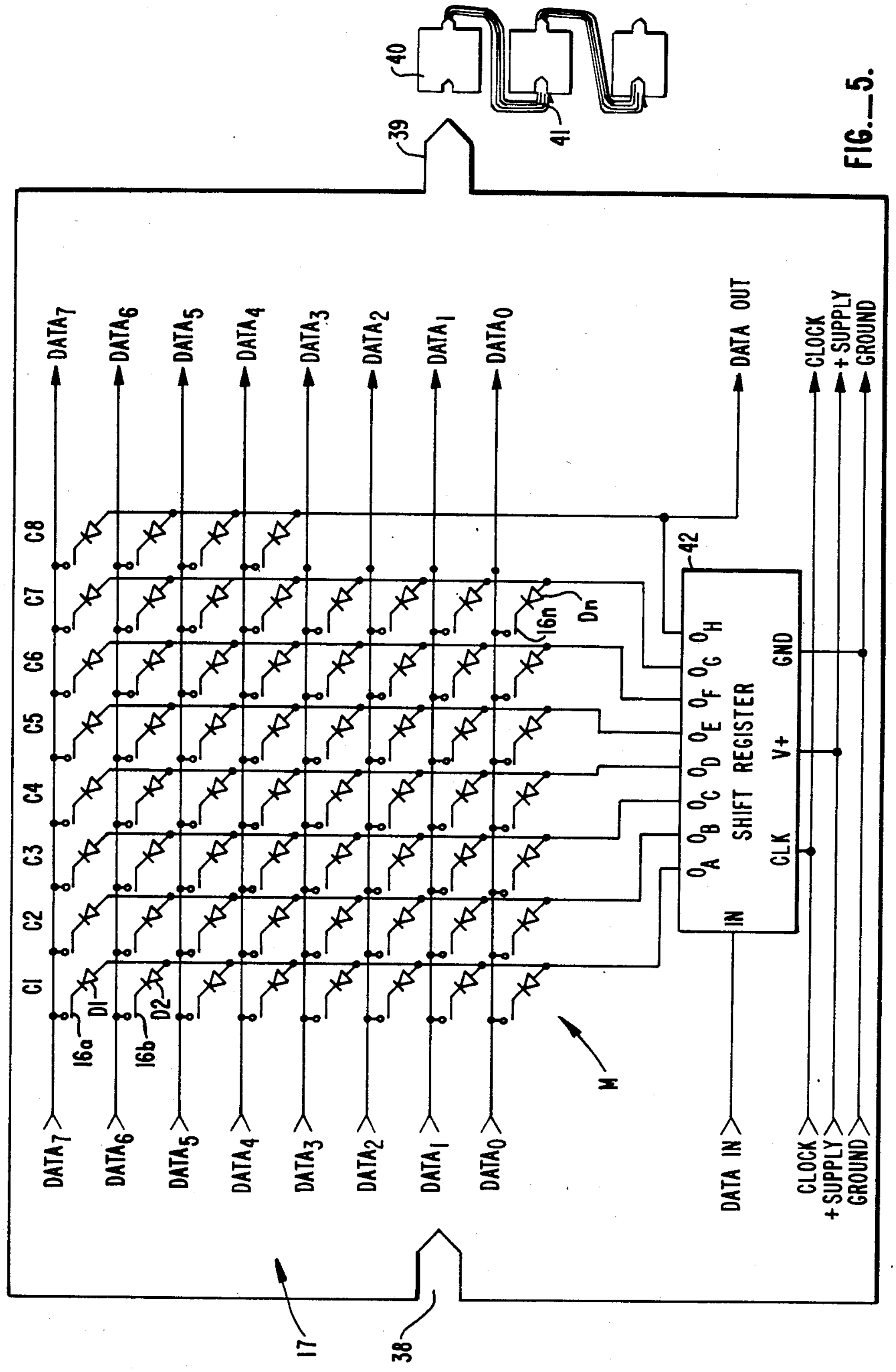
FIG. 5 is a schematic diagram showing in detail a switch assembly according to the present invention.

A schematic diagram showing in detail a switch assembly S is provided by FIG. 5. Switches 16*a*–16*n* are shown in a switch/diode matrix M, including columns C1–C8 and rows $DATA_0$–$DATA_7$. For the sake of simplicity, only switches 16*a*, 16*b*, and 16*n* are designated in FIG. 5 The discussion herein applies equally to the other switches shown but undesignated in the schematic diagram. Likewise, only accompanying diodes D1, D2, and Dn are designated in FIG. 5.

All switches are located at an intersection of the rows and columns of matrix M, as shown. Additionally, all twelve signal and control lines—$DATA_0$—$DATA_7$, DATA IN (or DATA OUT), CLOCK, +SUPPLY, and GROUND —are cascaded through all circuit boards used in the keyboard interface. Thus, lines 38 provide an input to switch assembly 17 and lines 39 provide an output therefrom. In like manner, lines 39 provide an input to switch assembly 40 and lines 41 provide an output therefrom.

The DATA IN and CLOCK signals are provided by a microprocessor (discussed below) and are used to drive the switch/diode matrix. The status of a particular switch is read back to the microprocessor via the data bus ($DATA_0$–$DATA_7$).

Each of matrix columns C1–C8 is driven by one output of a serial in/parallel out shift register 42. On initial power-up, the DATA IN line is held low by the microprocessor and the CLOCK line is pulsed repeatedly. In this way, a logic "zero" is propagated to all outputs of the shift register. The last output of the shift register is sent on the DATA OUT line to the next switch assembly, where it is used as DATA IN signal for the shift register associated with that switch assembly. Eventually, all matrix columns in all of the switch assemblies are initialized to a logic "zero", and the device is ready to start reading switch data.

To read a first group of eight switches, such as column C1, a logic "one" is placed on the DATA IN line and the CLOCK line is pulsed once. The logic "one" appears on shift register 42 output QA. Any switches in the column C1 that are closed change the corresponding data lines to a logic "one." All other data lines are held at a logic "zero" by the microprocessor.

The eight lines of the data bus ($DATA_0$–$DATA_7$) are then read by the microprocessor. Accordingly, switch associated keys are scanned in byte groups from which a keyboard data frame is assembled. To read the next (second) group of eight switches, the DATA IN line is held low and the CLOCK line is pulsed once. This Causes the logic "one" to shift from output QA of shift register 42 to output QB. The status of the second switch set can now be read by the microprocessor.

This process continues until all switch matrix columns in the switch assembly have been read. In the preferred embodiment, such process scans all keyboard keys once every 1 millisecond to provide sufficient resolution for capturing all keyboard information generated by the musician. To increase efficiency during the read process, the CLOCK pulses may be generated by the microprocessor simultaneously with the data read operation of the eight switch data lines ($DATA_0$–$DATA_7$). After all of the matrix columns in the first switch assembly have been read, the process continues at the next switch assembly. That is, the logic "one" is coupled via the DATA OUT line from the first switch assembly as a DATA IN signal to the next switch assembly.

Figure 6:
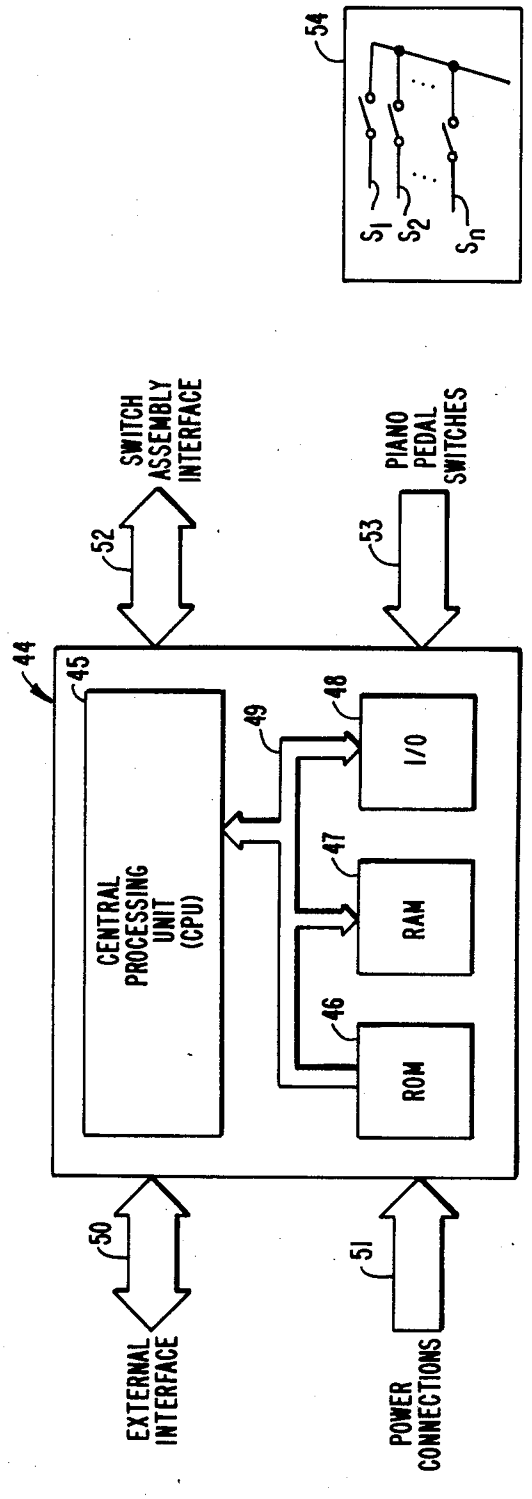
FIG. 6 is a block diagram of a microprocessor control for the present invention.

A block diagram of a microprocessor board is shown in FIG. 6. A conventional eight-bit computer 44 includes a CPU 45, read only memory 46, random access memory 47, and input/output elements 48. The microprocessor board receives power connections 51, information from the switch assemblies at connection 52, information from piano pedal switch assembly 54 at connection 53, and input and output information to and from the remote electronic musical instrument or storage device at connection 50.

Pedal switch assembly 54 includes switches S1, S2, and Sn. The preferred embodiment of the invention provides three pedal switches although any number of such pedal switches could be provided or the pedal switches may be dispensed with altogether. The pedal switches are conventional button or lever actuated switches that are mounted in contact with an appropriate section of the piano pedal linkage, or they may be separate foot-operated switch assemblies.

In the preferred embodiment of the invention, the pedal switches are operable to produce a piano sustain, a keyboard key transposition, and to effect keyboard range selection. Thus, note information sent to an external electronic music synthesizer can be instantaneously transposed by any interval to create harmony or octave transpositions. Keyboard range selection allows any range of keys on the piano to be defined as the active range, beyond which no note information is sent to the external synthesizer. In this way, the piano base line or lead line may be doubled to reinforce the acoustic piano line.

Figure 7:
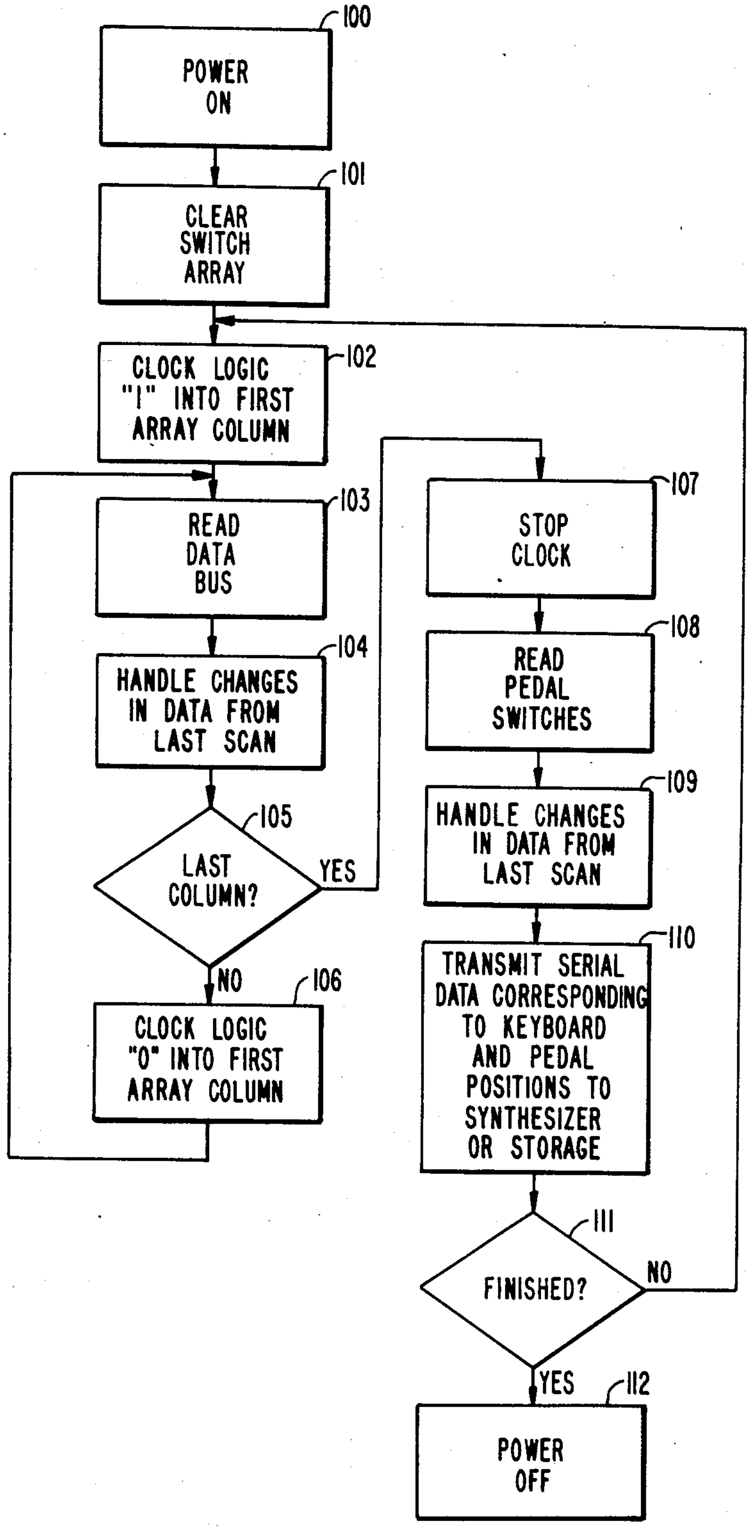
FIG. 7 is a flow diagram showing microprocessor operation of the present invention.

A flow diagram of a microprocessor control program is shown in FIG. 7. At power-on (100), the switch matrix is Cleared (101). After the matrix is cleared, a logic "one" is clocked into the first matrix column (102) and the data bus is read (103). Any changes in the data bus at that column location from a previous scan are processed by the microprocessor (104).

The microprocessor then checks to see if a last matrix column of a scan sequence has been read (105). If the last matrix column has not been read, then the microprocessor continues to clock a logic "zero" into the first matrix column (106). If the last column has been read, then the microprocessor stops the clock (107) and reads the pedal switches (108). If changes are present in the pedal switches from the last scan sequence, then these changes are processed by the microprocessor (109).

At the completion of a scan sequence, serial data corresponding to keyboard and pedal positions is transmitted to the external electronic music synthesizer or storage device (110). If the acoustic keyboard instrument is still in use (111), then the process repeats (102). If the musician is finished using the acoustic keyboard instrument, then the power is turned off (112).

The present invention is intended for installation in acoustic or electrically amplified pianos. The invention produces a serial data output stream that transmits all relevant details of the musician's performance in real time to drive an electronic musical instrument or an appropriate data storage device. In this manner, one performer may be effectively playing several instruments at once.

One important aspect of the present invention is the unique switch matrix discussed above. Such matrix reduces the cabling between the switch assemblies and the microprocessor, thus greatly simplifying the installation of the switch assemblies in the piano, and negligibly interfering with the piano action. Another advantage of the present invention is that no modification of the piano or attachment to the piano keys or moving components of the piano action of flags or switches is required. This greatly reduces installation time and avoids having to make adjustments to each key of the piano, either during installation or thereafter as part of a maintenance routine. Operation of the present invention is transparent to the performer— there is no noticeable change in touch or appearance of the piano.

The present invention allows electronic music synthesizers from different manufacturers to be connected to a piano keyboard. In this way, the acoustic action, which is preferred by most musicians, is maintained. Yet, the keyboard may be used to drive several electronic music synthesizers, or may be used to blend the acoustic instrument sounds with electronic instrument sounds in real time. In a studio setting, the time cost of rerecording synthesizer portions of a performance are eliminated by use of the invention, and, therefore, the cost of studio time is reduced. During a live performance, the invention allows a performer to select between several keyboard devices operated concurrently or separately from a single keyboard controller. Thus, a bigger sound is provided by fewer performers.

We claim:

1. In a musical instrument having a keyboard, a digital keyboard interface for use in enabling said musical instrument to communicate with an electronic music synthesizer, data storage device or the like, said interface comprising:

a plurality of modular switch assemblies securely positioned directly beneath said keyboard, each said switch assembly consisting of a plurality of switches associatated with a consecutive group of keys of said keyboard such that key actuation produces a corresponding switch actuation, said modular switch assemblies being physically and electrically identical to one another and being assigned to sequential sets of keyboard keys, with said switch assemblies being positioned end-to-end and interconnected for transparent cascaded operation along a predetermined number of common data and control lines; and matrix means for assigning switch actuation information to a corresponding bit position of a data byte in a digital data stream, said matrix means defining a plurality of columns and rows, each row corresponding to a bit position of said data byte, and said matrix means further comprising:

a shift register operable to sequentially actiate said plurality of columns, wherein each key actuated switch is operatively associated with the intersection of a matrix row and column, assigning an initial logic value to said corresponding bit position upon switch actuation when said shift register activates an associated column, and assigning an opposing logic value to said corresponding bit position in the absence of switch actuation when said shift register activates the associated column.

* * * * *